United States Patent

[11] 3,592,415

| [72] | Inventors | Gerald David Walley<br>Elksmere, Whittinghan Road, Long Ridge, Preston;<br>Thomas William Smith, 26 Ribley Avenue, Wrea Green, Preston; Geoffrey Stott, 49 Jepps Avenue, Barton, Preston, all of, England |
|---|---|---|
| [21] | Appl. No. | 824,118 |
| [22] | Filed | May 13, 1969 |
| [45] | Patented | July 13, 1971 |
| [32] | Priority | May 14, 1968 |
| [33] | | Great Britain |
| [31] | | 22918/68 |

[54] AIRCRAFT
4 Claims, 4 Drawing Figs.

| [52] | U.S. Cl. | 244/55 |
|---|---|---|
| [51] | Int. Cl. | B64c 7/02 |
| [50] | Field of Search | 244/53–55, 12, 23 |

[56] References Cited

UNITED STATES PATENTS

| 2,863,620 | 12/1958 | Vautier | 244/55 |
|---|---|---|---|
| 3,085,770 | 4/1963 | Sutton | 244/23 |
| 3,168,998 | 2/1965 | Eichholtz | 244/55 |

FOREIGN PATENTS

| 834,532 | 5/1960 | Great Britain | 244/54 |
|---|---|---|---|

*Primary Examiner*—Milton Buchler
*Assistant Examiner*—James E. Pittenger
*Attorney*—Sughrue, Rothwell, Mion, Zinn & MacPeak ABSTRACT: A low wing jet-engined aircraft having at least one aft-mounted engine on each side of the fuselage, and an air intake duct for each engine extending forward of the engine over the wing to an intake mouth positioned adjacent to, or forward of, the wing-leading edge.

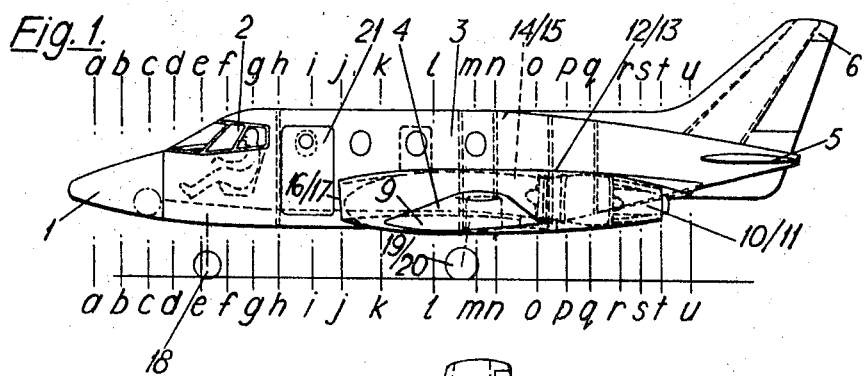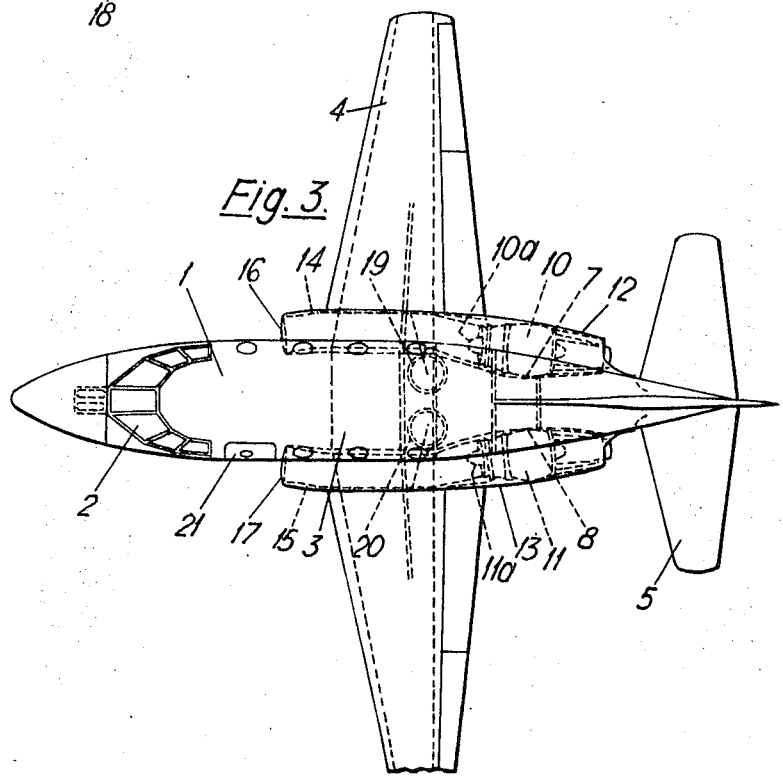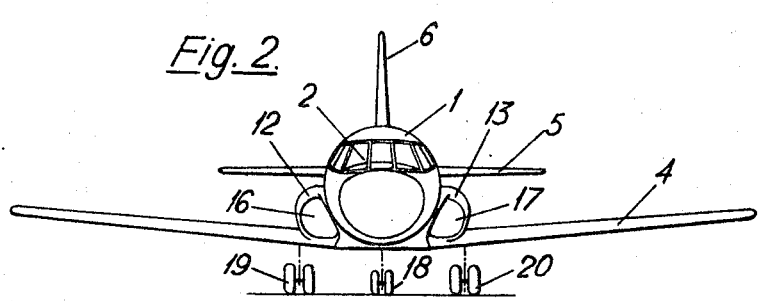

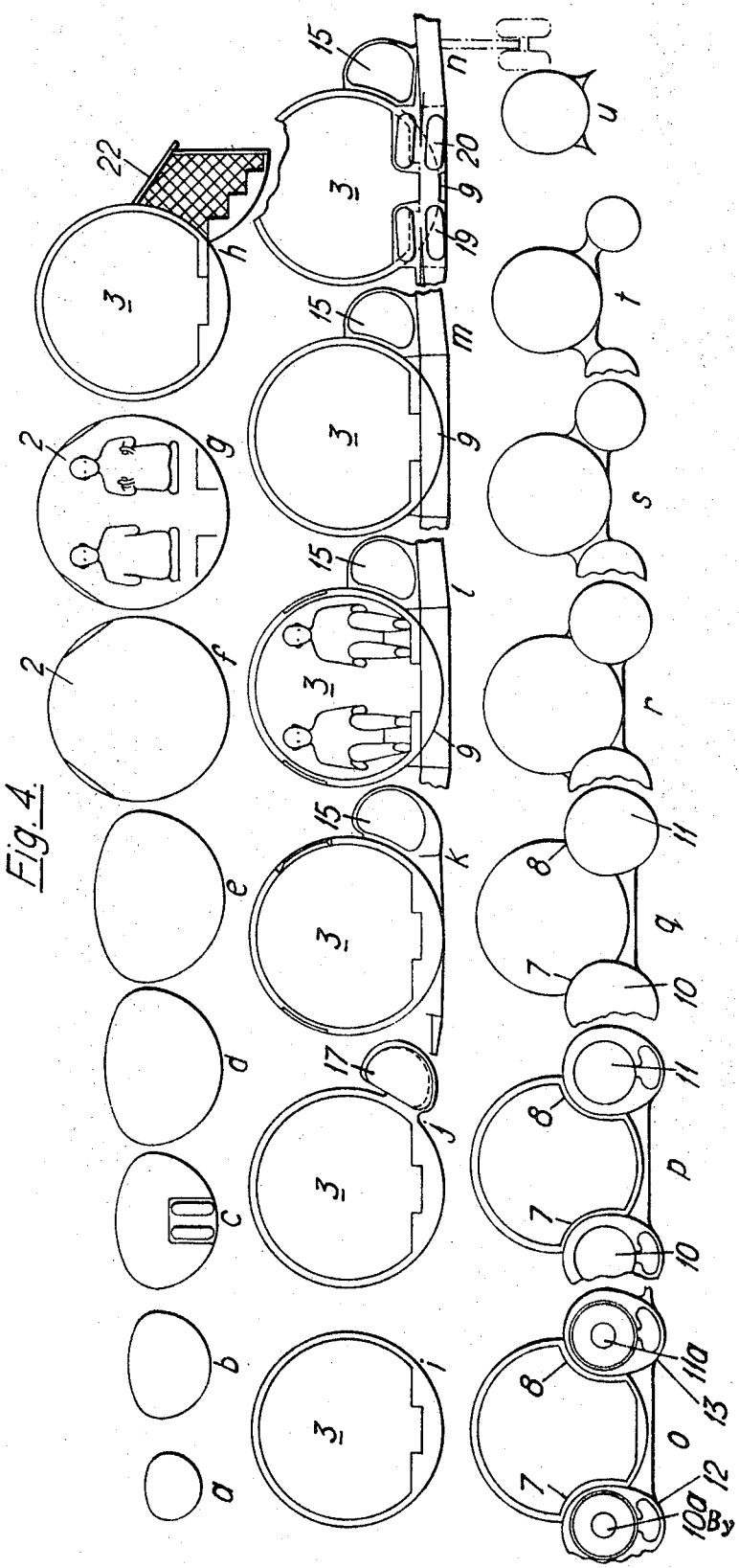

AIRCRAFT

The present invention relates to jet-engined aircraft and has particular application to passenger- or freight-carrying aircraft, which of necessity require a largely unobstructed fuselage interior. The term "jet engine" used in this specification includes both turbojet and turbofan engines.

It is well known to mount jet engines on either side of the rear fuselage of such aircraft. Normally engines in this position, which will be termed "aft-mounted engines," are housed in pods mounted on laterally extending pylons, the pods being some distance clear of the fuselage, to minimize drag caused by air flow interference at the junctions of the pylons with the fuselage and with the engine pods.

It is also known to house aft-mounted jet engines partially within the fuselage contour and partially in protruding blisters. This arrangement has less drag than pods.

If a low wing position is chosen to minimize undercarriage length and weight, it is necessary to dispose aft-mounted engines relatively high up on the fuselage, since each engine air intake must remain clear of the disturbed wake of the wing in normal flight conditions. This in turn means that, for aerodynamic and structural reasons, and also to clear the exhaust efflux, the tailplane must be mounted on the fin.

With such an aircraft configuration, if the angle of attack becomes high, for example greater than 10°, the engine intakes enter the disturbed wake of the wing, with consequent loss of engine power. Also the tailplane is liable to enter and remain in the disturbed wakes of the wing and of the engine pods or blisters, with consequent loss of pitching control of the aircraft. This condition is known as a "deep stall" and, because of the lack of engine power and pitching control, it is sometimes impossible for the aircraft to recover from it.

In existing aircraft of configuration such that "deep stall" conditions might be inadvertently reached, equipment is provided, in addition to normal stall-warning devices, to prevent the aircraft from approaching such conditions. An object of the present invention is to provide an aft-engined aircraft with an airframe configuration which inherently eliminates any possibility of "deep stall" conditions being reached.

According to the present invention a low wing jet-engined aircraft has at least one aft-mounted engine on each side of the fuselage, and an air intake duct for each engine extending forward of the engine over the wing to an intake mouth positioned adjacent to, or forward of, the wing leading edge.

Preferably at least one engine on each side of the fuselage is partially buried, i.e. is housed partially within the fuselage contour and partially within a blister protruding from the fuselage. Except immediately forward of the partially buried engines, the intake ducts are preferably external to the fuselage contour.

One embodiment of the invention is described below with reference to the accompanying drawings. In these drawings:

FIG. 1 is a side view of an aircraft;

FIG. 2 is a front view;

FIG. 3 is a plan; and

FIG. 4 comprises a series of cross sections through the aircraft fuselage, FIG. 4a being taken on the line a-a in FIG. 1, FIG. 4b being taken on the line b-b in FIG. 1, and so on.

The aircraft shown is a small passenger one, of 36 feet wing span with seating for four to eight passengers, in a fuselage having an internal diameter of 5 feet 2 inches, and a maximum speed of 550 to 600 m.p.h.

The aircraft has a fuselage 1, with a flight deck 2 and a passenger cabin 3, a low wing 4, a fuselage-mounted tailplane 5, and a fin 6. The main structure of the wing 4 passes through the underside of the fuselage under the cabin floor at 9.

Mounted partially within flutes 7, 8 formed in the lower rear fuselage are twin turbofan engines 10, 11. Parts of the engines protrude from the fuselage contour and are faired by blisters 12, 13 which are continued forward of the engines to house air intake ducts 14, 15. The intake ducts extend forward over the wing 4 and adjacent to its root, and terminate in intake mouths 16, 17 adjacent to the sides of the fuselage forward of the wing leading edge.

As shown clearly in FIG. 3, the intake ducts 14, 15 curve outwards from the engine faces 10a, 11a, that is, from the flutes 7, 8, to run fully outside the fuselage contour, thus leaving the majority of the passenger cabin free of constriction. The passenger seating lies between sections h-h and o-o.

The aircraft is provided with a tricycle undercarriage comprising a nose leg 18, capable of forward retraction into the fuselage, and twin main legs 19, 20 capable of inward retraction, so positioned on the wing that the wheels can be retracted into the lower fuselage behind the rear seats in the passenger cabin.

Since the port intake 17 is immediately aft of the passenger and crew entry door 21, a combined handrail and intake guard 22 is provided to prevent accident should the port engine be inadvertently operated when the door is open. The guard is shown in FIG. 4h in the extended position.

In paragraph seven of this specification this invention is stated to involve a low wing. By this is meant that the wing is anywhere below a midwing position. However, there is additional advantage in the wing being at the bottom of the fuselage, as then the engines are sufficiently low to enable the tailplane to be mounted on the fuselage rather than on the fin. This permits the actuating gear for the pitching control to be housed in the fuselage where there is enough space to enable the gear to be simple and robust. This is of value if, as shown in the example, an all-moving tailplane is used.

In paragraph seven of this specification this invention is stated to involve an intake mouth adjacent to, or forward of, the wing leading edge. In practice the intake should not be aft of the leading edge by a distance greater than half the intake diameter. It is preferable for the intake mouth to be forward of the leading edge, as this places it clearer from debris thrown up by the nose wheel of the undercarriage.

Some variation is possible in the position of the engines in the fore-and-aft direction, but in practice the inlet face of the engine is nearly abreast of the trailing edge of the wing and the rear of the passenger accommodation. The range of possible variation in design tends to be less in smaller aircraft, such as the example shown, because in such aircraft the ratio of engine length to fuselage length is greater than it is in larger aircraft.

It can be seen from the drawings that the axes of the engines are inclined, converging with one another rearwards in plan, and sloping downwards and rearwards relatively to the fuselage datum. The engine exhausts are a short distance forward of the tailplane and about an equal distance below it.

Even at high angles of incidence, as much as 15°, the air intakes remain clear of the disturbed wake of the wing, and since the engines can be tucked in close to the fuselage their blisters cause a minimum of airflow disturbance over the tailplane. The tailplane, being mounted on the fuselage, is sufficiently low to pass through the disturbed wake of the wing as incidence increases and at high incidence is actually below the wake. Pitch control and engine power can therefore be maintained, even at high angles of incidence and in conditions which would normally be associated with the "deep stall" phenomenon.

The invention is applicable to aircraft with more than two engines. By way of example, a four-engined aircraft could have engines mounted beside but outboard of the engines 10, 11, FIG. 3 and with intake ducts extending forward over the wing similar to dusts 14, 15. Preferably each outer engine is as close as possible to an inner engine and shares a common intake duct with it.

Although the wing 4 is illustrated in FIG. 3 as being unswept, the invention is also applicable to aircraft having a moderately swept wing, e.g. at 15°, plus a tailplane.

We claim:

1. A jet-engined subsonic aircraft having a low wing and a fuselage wherein the main structure of said wing passes through the underside of said fuselage, said wing having a leading edge and a trailing edge, at least one engine attached to the exterior surface of each side of said fuselage, each of said engines having a front face adjacent to the trailing edge of said wing, and an air intake duct for each engine extending forwardly of said engine over the wing with the intake mouth of the duct positioned forwardly of the leading edge of said wing.

2. An aircraft according to claim 1, in which at least one engine on each side of the fuselage is housed partially within the fuselage contour and partially within a blister protruding from the fuselage.

3. An aircraft according to claim 2, in which, except immediately forward of the said engines, the intake ducts are external to the fuselage contour.

4. An aircraft according to claim 1, including within the fuselage a cabin, the engines lying substantially entirely aft of the cabin, and the majority of the cabin being free of constriction by the intake ducts.